(12) United States Patent
Fuchioka et al.

(10) Patent No.: US 7,393,574 B2
(45) Date of Patent: Jul. 1, 2008

(54) INFORMATION RECORDING MEDIUM

(75) Inventors: Tamotsu Fuchioka, Ibaraki (JP);
Makoto Iimura, Ibaraki (JP); Makoto Miyamoto, Ibaraki (JP); Yoshihiro Ikari, Ibaraki (JP)

(73) Assignee: Hitachi Maxwell, Ltd., Ibaraki-shi (JP)

( * ) Notice: Subject to any disclaimer, the term of this patent is extended or adjusted under 35 U.S.C. 154(b) by 423 days.

(21) Appl. No.: 11/097,232

(22) Filed: Apr. 4, 2005

(65) Prior Publication Data

US 2005/0227035 A1 Oct. 13, 2005

(30) Foreign Application Priority Data

Apr. 7, 2004 (JP) ............... 2004-113168
Nov. 30, 2004 (JP) ............... 2004-346912

(51) Int. Cl.
*B32B 3/02* (2006.01)

(52) U.S. Cl. .................. 428/64.1; 428/64.4; 428/64.5; 428/64.6; 430/270.13

(58) Field of Classification Search ............... 428/64.5, 428/64.6; 430/270.13
See application file for complete search history.

(56) References Cited

U.S. PATENT DOCUMENTS

| | | | | |
|---|---|---|---|---|
| 5,278,011 A | * | 1/1994 | Yamada et al. | ............... 430/19 |
| 6,449,239 B1 | * | 9/2002 | Uno et al. | ............... 369/275.1 |
| 6,723,411 B2 | | 4/2004 | Hirotsune et al. | |
| 6,881,466 B2 | * | 4/2005 | Kojima et al. | ............... 428/64.1 |
| 7,012,878 B2 | * | 3/2006 | Shinotsuka et al. | ...... 369/275.4 |
| 7,063,876 B2 | * | 6/2006 | Nishihara et al. | ......... 428/64.1 |
| 7,335,459 B2 | * | 2/2008 | Ashida et al. | .......... 430/270.13 |
| 2004/0106065 A1 | | 6/2004 | Miyamoto et al. | |
| 2004/0264357 A1 | | 12/2004 | Ikari et al. | |

FOREIGN PATENT DOCUMENTS

| | | |
|---|---|---|
| JP | A-64-079945 | 3/1989 |
| JP | A-05-144083 | 6/1993 |
| JP | A 10-154352 | 6/1998 |
| JP | A-63-225935 | 9/1998 |
| JP | A-2001-101712 | 4/2001 |
| JP | A 2003-178487 | 6/2003 |
| JP | A 2004-155177 | 6/2004 |
| JP | A 2005-038568 | 2/2005 |
| WO | WO 2004/105008 A1 | 2/2004 |

* cited by examiner

*Primary Examiner*—Elizabeth Mulvaney
(74) *Attorney, Agent, or Firm*—Oliff & Berridge, PLC

(57) ABSTRACT

In an information recording medium, a Bi—Ge—Te material is adopted as a phase-change recording layer material. A C—Ta—O material is used for at least any one of first and second boundary layers which are in contact with a recording layer.

14 Claims, 2 Drawing Sheets

INFORMATION RECORDING MEDIUM

BACKGROUND OF THE INVENTION

1. Field of the Invention

The present invention relates to an information recording medium in which recording, playback, and rewrite can be performed at high speed and high density using a phase change of a recording layer caused by laser irradiation.

2. Description of the Related Art

One of rewritable information recording media is a phase-change optical recording medium. A phase-change optical recording medium includes a recording layer in which the atomic arrangement reversibly changes between two different states (amorphous and crystalline states) by applying a light beam. Information is recorded by utilizing the two different states of the atomic arrangement of the recording layer. Phase-change optical recording media are particularly low priced among rewritable media, and therefore the consumer use thereof is significantly increasing. In particular, the use as home video recording media is rapidly increasing. By replacing video recording media, which have been tapes heretofore, with disks of phase-change optical recording media, new functions such as time-shift playback can be realized. Accordingly, more advanced characteristics are required than those required for phase-change optical recording media heretofore used as backup media for computers. For example, in the case of time-shift playback, since a just-recorded image needs to be followed and played back during recording, it is necessary to change between recording and playback at regular time intervals at high speed. In order to achieve this, it is necessary to further increase access speed for the recording and playback of information.

In a conventional phase-change optical recording medium, information is recorded and played back by controlling the number of revolutions of the medium by the constant linear velocity (CLV) technology. Since the CLV technology is a controlling method in which the relative velocity (linear velocity) between a light beam and the medium is always constant, the data transfer rate in recording and playback is always constant. Accordingly, it is possible to enormously simplify a signal processing circuit used for the recording and playback of information.

However, in the CLV technology, when the light beam moves in the radial direction on the medium, the number of revolutions of a motor needs to be adjusted according to the radial position of the light beam on the medium so that the linear velocity is maintained constant. Accordingly, the access speed for the recording and playback of information becomes low in the CLV technology.

On the other hand, in the constant angular velocity (CAV) technology in which information can be recorded and played back with the number of revolutions of a medium maintained constant, the number of revolutions of a motor does not need to be controlled according to the radial position. Accordingly, high-speed access can be realized.

However, in the CAV technology, since the data transfer rate in recording and playback varies depending on the radial position, a signal processing circuit used for the recording and playback of information becomes complicated. Further, in the CAV technology, since the linear velocity increases toward a peripheral portion of the disk, the crystallization speed of the recording layer in inner tracks have to be higher than that in outer tracks. Accordingly, in the CAV technology, a special recording layer is needed which has a crystallization speed ready for both of a high linear-velocity region in an outer portion of the disk and a low linear-velocity region in an inner portion thereof. In a phase-change optical recording medium, a Ge—Sb—Te alloy is generally used as a phase-change material for a recording layer. Specific examples include $Ge_2Sb_2Te_5$, $Ge_6Sb_2Te_9$, and $Ge_8Sb_2Te_{11}$. The melting points of these are approximately 650° C. In order to reduce thermal damage to a substrate caused by heating such a phase-change material to a temperature equal to or higher than the melting point using a laser beam and cooling it in recording, protective layers made of dielectric material are often formed on both surfaces of the recording layer. Furthermore, a technology has been proposed which relates to an information recording medium having a structure that improves repeated-rewrite resistance by providing boundary layers between the recording layer and the protective layers, providing $Cr_2O_3$, Ge—N, GeCrN, or the like in the boundary layers, and thus preventing a chemical reaction between the recording layer and the protective layers and atom diffusion.

For example, according to Japanese Unexamined Patent Publication No. 2003-178487, a decrease in reflectivity caused by multiple rewrites can be suppressed by depositing a mixture of $Ta_2O_5$ and $Cr_2O_3$ with a thickness of 26 nm on an energy beam incident side of a recording layer.

(Patent Document 1) Japanese Unexamined Patent Publication No. 2003-178487

In known technologies, as phase-change recording layer materials with which high-speed recording can be performed, Ge—Sb—Te materials on the line connecting GeTe with Sb2Te3 in a triangle with vertices Ge, Sb, and Te are often used because of the high crystallization speeds thereof. Further, it has been known that the crystallization speed is further increased by substituting SnTe for GeTe in the above-described Ge—Sb—Te phase-change materials. GeTe has a melting point of 725° C., whereas SnTe has a high melting point of approximately 800° C. Accordingly, Ge—Sb—Sn—Te materials obtained by substituting SnTe for GeTe have higher melting points. In addition, a rewritable DVD medium in which the above-described high-speed recording can be performed is required to have performance in which recording is favorably performed even in conventional low-speed recording, in addition to high-speed recording. For example, in the case of a 4.7 GB DVD-RAM, the recording linear velocity (2× speed) defined in the specification for low-speed recording is 8.2 m/s. However, in a DVD-RAM ready for 5× speed recording, it is required that favorable recording performance can be obtained in a very wide linear velocity range of 8.2 m/s to 20.5 m/s. In order to satisfy this condition, the inventors of the present invention further studied Ge—Sn—Sb—Te materials obtained by substituting SnTe for GeTe in the above-described Ge—Sb—Te phase-change materials, by increasing SnTe to improve the crystallization speed. However, it was revealed that the above-described characteristics cannot be satisfied. Specifically, by substituting SnTe for GeTe, the difference in refractive indexes of the recording layer between crystalline and noncrystalline (amorphous) states is decreased with increasing Sn. Moreover, the crystallization speed of the recording layer becomes too high at low linear velocities. For this reason, in a cooling process immediately after heating the recording layer to a temperature equal to or higher than the melting point using a laser beam, crystals grow from an outer edge portion of a melted region, and recrystallization therefore occurs, which reduces a recording mark size. Thus, there arises the problem that a reproduced signal is reduced.

In order to solve these, the inventors of the present invention further studied phase-change recording layer materials of BiGeTe which are suitable for speed enhancement. According to an experimental study by the inventors, for example, the composition of Bi7Ge43Te50 suitable for speed enhancement is a composition in which Ge is excessively added more than those on the line connecting GeTe with Bi2Te3 in a composition triangle with vertices Bi, Ge, and Te. It has been proved that such compositions can satisfy the aforementioned characteristics in a wide range from low-speed recording to a high-speed recording. The reasons for this are the following: activation energy for crystallization is large in the vicinity of Ge50Te50 in the aforementioned composition triangle, and the stability of an amorphous mark increases in low-speed recording; and high-speed crystallization is allowed because an appropriate amount of BiTe is added. However, the melting point of such a composition is at least 700° C. or more, which is higher than approximately 650° C. of conventional Ge—Sb—Sn—Te phase-change materials by approximately 50° C. Accordingly, in a phase-change optical recording medium in which a phase-change material in this composition region is used, excellent rewrite resistance, shelf life, and reproduced-signal output characteristics will probably be very hard to obtain if $Cr_2O_3$ or GeCr—N is used, which have been heretofore used in low melting-point phase-change recording media.

Against this background, the inventors of the present invention prepared information recording media in which the aforementioned boundary layers and phase-change recording film materials with high melting-point were used, and investigated multiple-rewrite performance, shelf life under a humidified environment, and reproduced-signal output characteristics. As for reproduced-signal output characteristics, favorable characteristics could be obtained by optimizing the amount of added Bi among compositions in which Ge is excessively added more than those on the line connecting GeTe with Bi2Te3 in a composition triangle with vertices Bi, Ge, and Te. However, it was proved that multiple-rewrite performance is favorable in materials except $Cr_2O_3$. In Japanese Unexamined Patent Publication No. Hei 10(1998)-154352, it is described that multiple-rewrite performance is improved by using $Cr_2O_3$ for a boundary layer. However, an experiment by the inventors revealed that multiple-rewrite performance deteriorates in the case where a high melting-point material is used as a recording film material. On the other hand, as for shelf life in a humidified environment, it was proved that only $Cr_2O_3$, which is inferior in multiple-rewrite performance to others, shows favorable characteristics.

SUMMARY OF THE INVENTION

Accordingly, an object of the present invention is to provide an information recording medium including a phase-change recording layer material with which CAV recording can be performed in a wide range from low-speed recording to high-speed recording and a boundary layer which is excellent in multiple-rewrite performance and excellent in shelf life under a humidified environment.

First, the inventors of the present invention found out that excellent characteristics can be obtained in a wide range from low linear velocity to high linear velocity by using a Bi—Ge—Te phase-change material obtained by substituting Bi for Sb of a Ge—Sb—Te alloy in order to realize the aforementioned high-speed recording. The composition range is a region in which Ge is excessively added more than those on the line connecting GeTe and Bi2Te3 in a composition triangle with vertices Bi, Ge, and Te. It was proved that characteristics more excellent than those of Ge—Sb—Te materials can be obtained in this region. Specifically, advantages of GeTe are maintained, which advantages are a large difference in refractive indexes between crystalline and non-crystalline states, a high crystallization temperature, and a large activation energy; and, in addition, the crystallization speed also becomes high, and favorable erasing characteristics can be obtained even in high linear-velocity recording.

However, since the crystallization speed decreases if Ge is added excessively, a region in which Ge is appropriately added is suitable.

In the case where a Bi—Ge—Te alloy having such excellent characteristics is used for a recording layer of a phase-change optical recording medium, a practical composition range thereof is a range surrounded by each point (Bi3, Ge46.2, Te50.8), (Bi5, Ge46, Te49), (Bi13, Ge38, Te49), and (Bi10, Ge38, Te52) on a composition triangle with vertices Bi, Ge, and Te. However, in the case where a Bi—Ge—Te alloy in such a composition range is used for the recording layer, the melting point thereof is higher than those (approximately 650° C.) of GeSnSbTe and the like which have been heretofore used as phase-change materials, as described previously. Accordingly, in the case where $Cr_2O_3$ or GeCr—N heretofore with low melting point used for phase-change recording media is used, it is difficult to obtain both excellent rewrite resistance and shelf life.

Against this background, first, since shelf life is favorable when $Cr_2O_3$ is used for a boundary layer, material properties of this $Cr_2O_3$ were investigated as to the reason why multiple-rewrite performance is inferior. Then, it was proved that $Cr_2O_3$ can become an indefinite compound of Cr deficiency, $Cr_{2-x}O_3$ (x<0.077). The reason why $Cr_2O_3$ is inferior in multiple-rewrite performance to other boundary layer materials in the case where a high melting-point recording film material is used is that oxygen which is not coupled due to this Cr deficiency exists and oxidizes a recording film material.

Considering such physical properties, the inventors of the present invention thought that a method is effective in which the following material is added to $Cr_2O_3$: a material that cancels Cr deficiency; i.e., a material such as an oxide, a nitride, or an oxynitride having oxygen deficiency or nitrogen deficiency; in particular, an oxide, a nitride, or an oxynitride of a transition metal which has oxygen deficiency or nitrogen deficiency. Furthermore, $Ta_2O_5$ was finally selected as a material which has a high melting point among transition metals and in which an oxide or a nitride can stably exist. As a result of a study by the inventors of the present invention, it was revealed that even $Ta_2O_5$ alone satisfies a target for signal deterioration in multiple rewrites but cannot satisfy a target for shelf life under a humidified environment. One of the points of the present invention is that the following was revealed: both of signal deterioration in multiple rewrites and shelf life under a humidified environment become favorable by adding $Ta_2O_5$ to $Cr_2O_3$.

Furthermore, the inventors of the present invention revealed that the crystallization speed of the recording layer greatly depends on the compositions of the first and second boundary layers other than the aforementioned recording film composition. In particular, as a result of comparing the case where $Cr_2O_3$ is used for the second boundary layer and that where Cr—Ta—O is used for the second boundary layer, it was revealed that the crystallization speed of the recording layer for the case of Cr—Ta—O becomes lower than that for the case of $Cr_2O_3$. A conceivable reason for this is that, though $Cr_2O_3$ is a material in which oxygen is prone to become excessive due to Cr deficiency as described previously, $Ta_2O_5$ which is added in order to cancel the oxygen excess reduces the crystallization speed of the recording layer.

On the other hand, the inventors compared the crystallization speeds in the inner and outer portions of a recording film layer in a disk-like information recording medium in which high-speed recording can be performed and in which Bi—Ge—Te is used for the recording film layer, and consequently revealed that the crystallization speed of the recording film layer in the outer portion is high. A conceivable reason for this is the following: polycarbonate having a high water-absorbing capacity is generally used for a substrate of an information recording medium; water contained in this polycarbonate is prone to be evaporated in a vacuum in which the recording layer of the information recording medium is deposited; and this evaporated water is prone to spread to the film deposition side. Further, it is probable that this spread of water affects the outer portion of the information recording medium more strongly than the inner portion thereof, in particular, oxygen in the outer portion of the second boundary layer becomes excessive due to the spread of the water compared to that in the inner portion, and, consequently, the crystallization speed of the recording layer in the outer portion becomes higher than that in the inner portion. In this connection, the inventors studied the crystallization speed of the recording layer in the outer portion by setting the Ta content of Cr—Ta—O of the second boundary layer in the outer portion of the information recording medium larger than that in the inner portion thereof. As a result, by setting the Ta content of Cr—Ta—O of the second boundary layer in the outer portion larger than that in the inner portion, the crystallization speed of the recording layer was decreased, and a favorable information recording medium could be obtained in which the inner and outer portions are identical in the crystallization speed of the recording layer.

Moreover, a study by the inventors of the present invention revealed that, in the case where a Cr—Ta—O material of the present invention is used for a boundary layer, the jitter of a reproduced signal deteriorates in multiple rewrites if the film thickness is too small or too large. In the case where the film thickness is too small, a protective layer material is diffused in the recording film with multiple rewrites. In the case where the film thickness is too large, the cause of a deterioration in reproduced-signal jitter in multiple rewrites has not been revealed. However, since the thermal expansion coefficient of the Cr—Ta—O material is large, in the case where the film thickness is too large, it is probable that cracks appear between portions to which a laser beam has been applied and the other portions due to thermal expansion, and that the protective layer material is consequently diffused in the recording film. As a result of the detailed study, an optimum film thickness is 0.8 nm to 8 nm, preferably 1.0 nm to 3.0 nm.

Accordingly, an object of the present invention is achieved by using the following information recording medium:

(1) An information recording medium in which at least a first boundary layer, a recording layer, a second boundary layer, a light absorption layer, and a reflective layer are stacked on a substrate and in which information is recorded and played back in the recording layer by applying a laser beam, wherein the recording layer is made of a phase-change material containing Bi, Ge, and Te; and at least any one of the first and second boundary layers which are in contact with the recording layer contains Cr, Ta, and O, and has a film thickness of 0.8 nm to 8 nm.

(2) The information recording medium described in (1), wherein a composition ratio (at %) of the recording layer is in a range surrounded by the following points on a composition triangle with vertices Bi, Ge, and Te:
A1 (Bi3, Ge46.2, Te50.8)
A2 (Bi5, Ge46, Te49)
B1 (Bi13, Ge38, Te49)
B2 (Bi10, Ge38, Te52)

Further, the inventors of the present invention studied an optimum composition range of a Cr—Ta—O boundary layer which satisfies both of a target for signal deterioration in multiple rewrites and that for shelf life in a humidified environment, and obtained the following result:

(3) The information recording medium described in (1), wherein a composition ratio between Cr and Ta in at least the boundary layer is selected from CrxTay ($0.05 \leq y/x \leq 0.7$).

Furthermore, the inventors revealed that, in the case where the first boundary layer is provided on the laser beam incident side and the second boundary layer is provided on the opposite side of the recording layer from the laser beam incident side and both of the first and second boundary layers are in contact with the recording layer, large effect can be obtained when a boundary layer material of the present invention is used for the first boundary layer. This is because, in the case where a boundary layer of the present invention is used for the first boundary layer, there occurs the harmful effect that the crystallization speed of the recording film is decreased, depending on a combination with a recording film composition. However, since the effect of suppressing signal deterioration in multiple rewrites is large, a Cr—Ta—O boundary layer can also be adopted as the second boundary layer. However, in this case, an optimum Ta content is preferably smaller than that of the first boundary layer in consideration of the above-described harmful effect.

(4) The information recording medium described in (1), further including: a first boundary layer provided in contact with the recording layer and on a laser beam incident side; and a second boundary layer provided in contact with the recording layer and on an opposite side of the recording layer from the laser beam incident side, wherein a Ta content of the second boundary layer is smaller than that of the first boundary layer.

(5) The information recording medium described in (1), wherein a shape of the information recording medium is disk-like, a Ta content of at least any one of the first and second boundary layers has a composition gradient in an inner-to-outer direction, and the Ta content in an outer portion is higher than that in an inner portion.

Incidentally, in the present invention, the control of the film thickness of a Cr—Ta—O boundary layer is very important. As for means for realizing the above-described film thickness, a Cr—Ta—O material is previously deposited by sputtering or the like to a film thickness (e.g., approximately 50 nm) which can be precisely measured, the deposition rate per unit time is found, and deposition is performed for a time corresponding to the above-described film thickness using the found deposition rate. Further, in the case where desired characteristics cannot be obtained, an accurate film thickness is measured using a cross-sectional transmission electron microscope (TEM) or the like. In the case where the film thickness is measured using a cross-sectional TEM or the like, the film thickness is not necessarily uniform in some cases. In such cases, an average film thickness may be defined as the film thickness of the Cr—Ta—O boundary layer. If the average film thickness is in the aforementioned range, effects of the present invention are not lost.

As described above, according to the present invention, excellent recording/playback characteristics can be obtained in a wide range from low-speed recording to high-speed recording by using a Bi—Ge—Te phase-change material, which is a high melting-point phase-change material, for a recording layer. Further, by providing a Cr—Ta—O boundary layer as at least any one of first and second boundary layers which are in contact with the recording layer, it is possible to provide an optical information recording medium which is excellent in multiple-rewrite performance and excellent in shelf life under a humidified environment.

DESCRIPTION OF THE PREFERRED EMBODIMENTS

Hereinafter, embodiments of the present invention will be described in detail.

Figure 2:
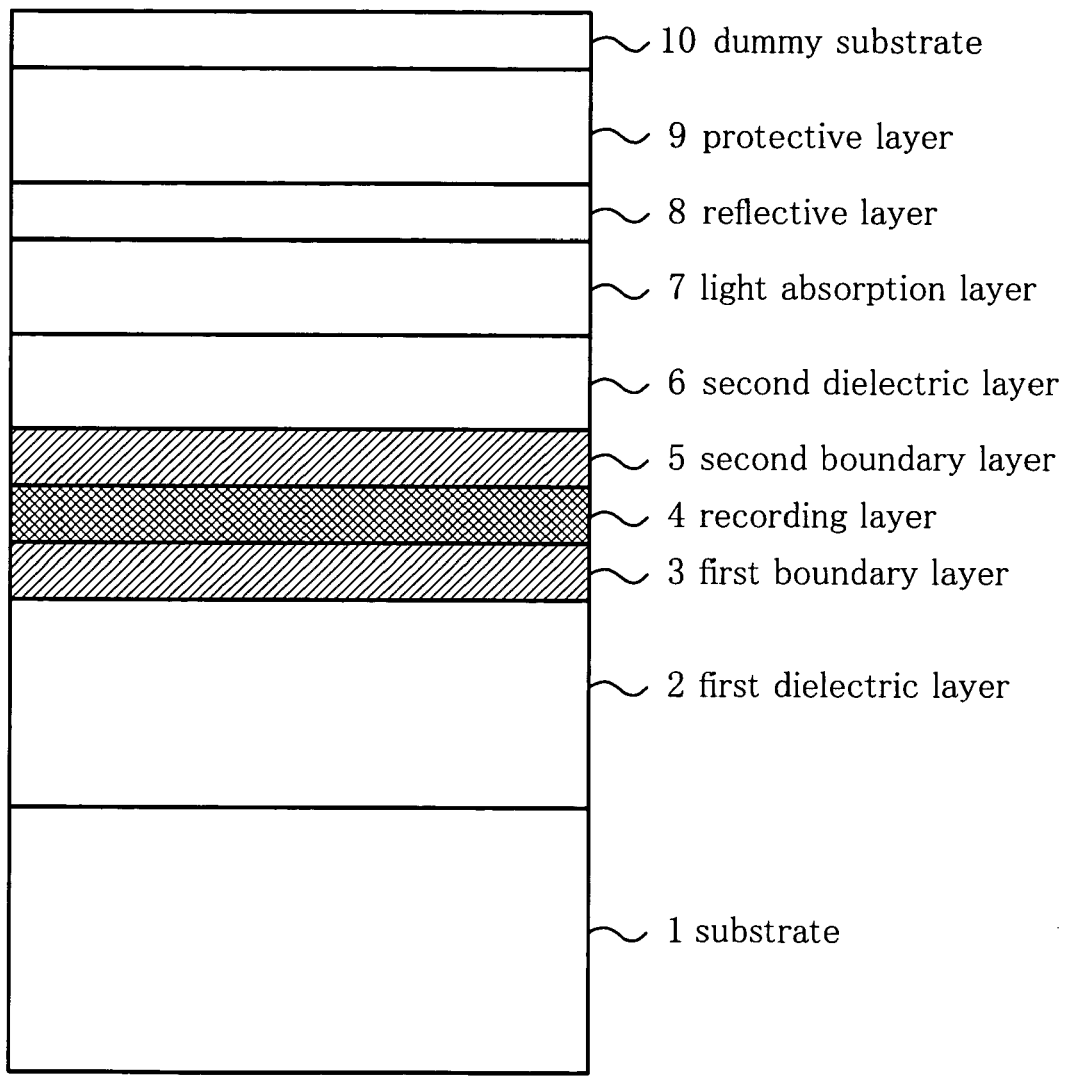
FIG. 2 is a cross-sectional view of an optical recording medium used in examples of the present invention.

FIG. 2 is a schematic cross-sectional view of an optical recording medium prepared. On a polycarbonate substrate 1, sequentially formed were (ZnS) (80)-($SiO_2$) (20) mol % as a first dielectric layer 2, a material made of Cr—Ta—O as a first boundary layer 3, a material made of Bi—Ge—Te as a recording layer 4, a material made of Cr—Ta—O as a second boundary layer 5, a material made of (ZnS) (80)-($SiO_2$) (20) mol % as a second dielectric layer 6, a material made of (Cr) (85) ($Cr_2O_3$) (15) (at %) as a light absorption layer 7, and AgCu (1 wt %) Ca (500 ppm) as a reflective layer 8, using a sputtering system which has a plurality of sputtering chambers and which has a small distribution of film thicknesses and a high reproducibility. A protective layer 9 made of ultraviolet curing resin was formed on the reflective layer 8, then completing a disk having a structure in which a dummy substrate having a thickness of 0.6 mm is attached thereto.

As the polycarbonate substrate 1 used here, used was a substrate having a spiral-shaped pregroove for tracking on the substrate surface and having a constitution in which tracks of grooves and tracks of lands are alternately connected.

As the materials for the first and second dielectric layers, it is possible to use, other than the mixture (ZnS) (80)-($SiO_2$) mol %, a mixture in which the mixing ratio is changed, an oxide, such as $SiO_2$, $Ta_2O_5$, or $Al_2O_3$, or a nitride such as Si—N, Al—N, or Ge—N.

As the material used for the light absorption layer 7, other than $Cr_{85}$—$CrO_{15}$, a material may be used in which the composition ratio of Cr—CrO is changed. However, a Cr content of 70 (at %) or more is preferable in order to obtain an optically optimum refractive index. If the Cr content further increases, the crystal structure becomes a hexagonal close-packed crystal, and individual crystals grow into columns. Consequently, there arises the problem that stress acts on crystalline interfaces, and there arises the problem that cracks appear in the deposited film after long storage of approximately 10 years. Accordingly, it is more preferable that the Cr content is in the range of 85 to 90 (at %).

This makes it possible to suppress the problem that cracks appear in the deposited film after long storage, and further makes it possible to make corrections so that the difference in reflectivities between crystalline and amorphous states becomes large and that the light absorption ratio in the amorphous state is smaller than that in the crystalline state.

Further, the film thickness of the above-described light absorption layer 7 is preferably 10 nm to 50 nm. By limiting the film thickness thereof within the range of 15 nm to 35 nm, favorable overwrite characteristics can be obtained in a wide range from low-speed recording to high-speed recording. The light absorption layer has the effects of suppressing waveform distortion after rewrite and improving overwrite characteristics. This is because the light absorption ratio of the recording layer itself differs depending on whether the recording layer is in an amorphous state or a crystalline state.

The light absorption ratio in an amorphous state is generally larger than that in a crystalline state. Accordingly, in an amorphous portion, a temperature rise is large, and a recording mark width becomes larger than a predetermined one. In order to suppress this, the light absorption layer is formed and caused to absorb light. The light absorption layer has the function of suppressing waveform distortion by making corrections so that the light absorption ratio of the recording layer in the amorphous state is smaller than that in the crystalline state. If the film thickness of the above-described absorption layer becomes 10 nm or less, the above-described effect is reduced by half. Further, if the film thickness of the above-described absorption layer becomes 50 nm or more, the effect is suppressed which transfers to the reflective layer 8 heat generated when recording is performed on the recording layer, and favorable overwrite characteristics cannot be obtained. Moreover, since crystals grow into columns, cracks are prone to appear in the deposited film.

As a material used for the reflective layer 8, other than AgCu (1 wt %) Ca (500 ppm), it is possible to use a material in which the composition ratio among Ag, Ca, and Cu is changed or an alloy containing Ag as a major constituent.

With the above-described constitution, it is possible to provide an information recording medium including a phase-change recording layer material in which CAV recording can be realized in a wide range from low-speed recording to high-speed recording and a boundary layer which is excellent in multiple-rewrite performance and excellent in shelf life in a humidified environment.

Hereinafter, examples for confirming effects of the present invention will be described in detail.

EXAMPLE

Example 1

(Preparation of Information Recording Medium)

Figure 1:
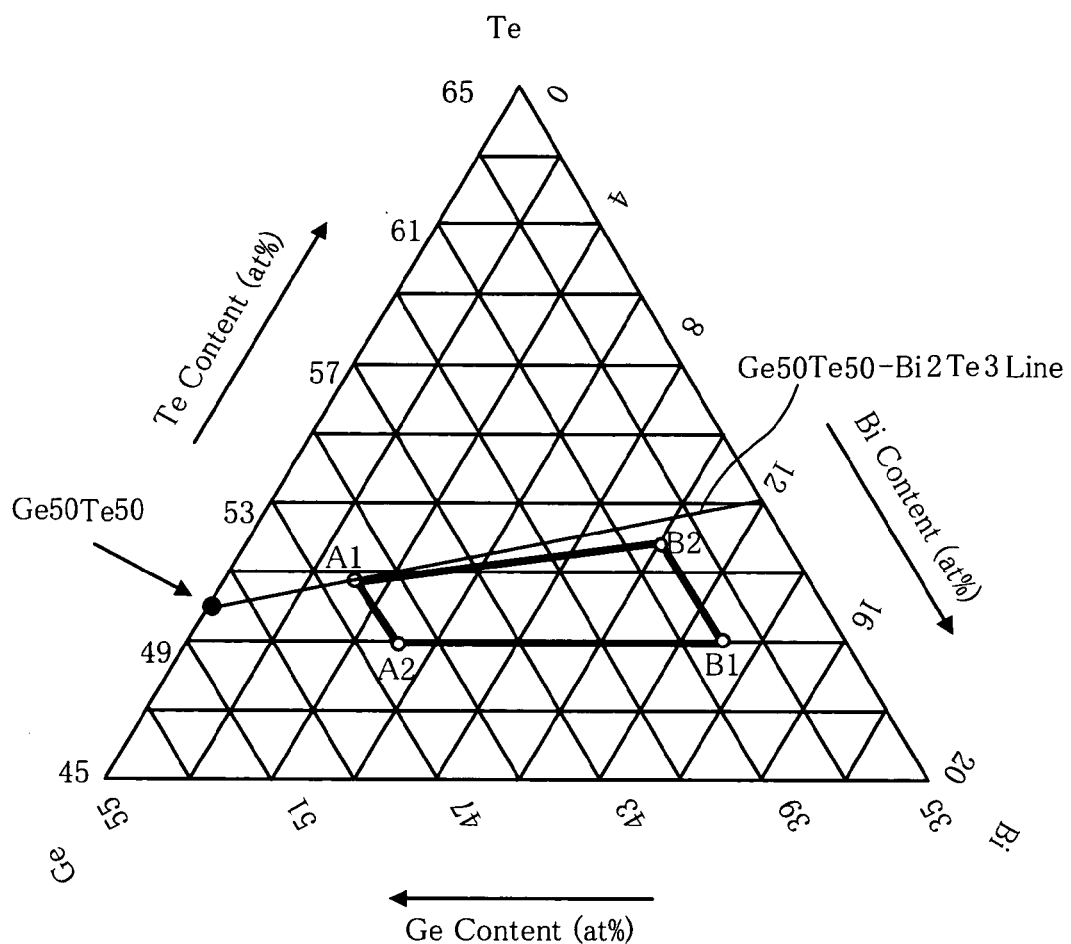
FIG. 1 is a composition triangle for a recording layer.

First, in order to study phase-change recording layer materials with which CAV recording can be realized in a wide range from low-speed recording to high-speed recording, a disk having the structure shown in FIG. 1 was prepared as follows.

On a polycarbonate substrate 1 of 120 mm in diameter and 0.6 mm in thickness, first, a material made of (ZnS) (80)-($SiO_2$) (20) mol % was formed as the first dielectric layer 2 to a film thickness of 150 nm, using a sputtering system which has a plurality of sputtering chambers and which has a small distribution of film thicknesses and a high reproducibility. Subsequently, a material made of $Cr_2O_3$ was formed as the first boundary layer 3 to a film thickness of 2 nm, and a material made of Bi—Ge—Te was formed as the recording layer 4 thereon to a film thickness of 9 nm. As for a method of forming Bi—Ge—Te, two targets were attached to the inside of one sputtering chamber, one of which was a GeTe target and the other of which was a BiGeTe target, and each recording layer composition was adjusted by changing sputtering powers of the two by simultaneous sputtering. Next, a material made of $Cr_2O_3$ was formed as the second boundary layer 5 to a film thickness of 2 nm, and a material made of (ZnS) (80)-($SiO_2$) (20) mol % was formed as the second dielectric layer 6 thereon to a film thickness of 30 nm. Furthermore, on the second dielectric layer 6, a material made of Cr (85)-CrO (15) (at %) was formed as the light absorption layer 7 to a film thickness of 25 nm. Thereafter, a material made of AgCu (1 wt %) Ca (500 ppm) was formed as the reflective layer 8 to a film thickness of 100 nm. The protective layer 9 made of ultraviolet curing resin was formed on the reflective layer 8, then completing a disk having a structure in which a dummy substrate having a thickness of 0.6 mm is attached thereto.

In order to initially crystallize this disk, the entire disk surface was initially crystallized by using a semiconductor laser (wavelength of 810 nm) and applying laser light having an elliptical beam with a laser spot size of 1×50 μm.

Next, an information recording apparatus for evaluating recording/playback characteristics will be described. In this example, an information recording apparatus was used which includes a semiconductor laser (having a wavelength of 655 nm and a numerical aperture of 0.6) for applying light to the information recording medium at the time of the recording or playback of information, a laser driver for controlling the output of the semiconductor laser, a waveform generator for generating a recording pulse generated in accordance with recording information, a waveform equalizer, and a binarizer.

In the information recording apparatus used in this example, 8/16 modulation was used, and recording marks of mark edge recording were formed in the information recording medium to record information therein. The shortest mark length was 0.42 μm. In this example, a random pattern of 3 T to 14 T was recorded as information in the information recording medium ten times by overwrite, and the random pattern was played back, thus evaluating the jitter of the information recording medium. Further, an accelerated test was performed in order to evaluate the shelf life. Specifically, a random pattern of 3 T to 14 T was recorded as information in the information recording medium ten times by overwrite, the jitter thereof was evaluated, this disk was stored for 16 hours in an environment of an atmosphere of 90° C. and 80% RH, and then the jitter (archival playback jitter) was evaluated. Further, overwrite recording is performed once on the information recording medium in which overwrite recording had been performed ten times before storage, and the jitter (archival OW) was evaluated. In this example, the recording and playback of information were performed at a low linear velocity of 8.2 m/s and a high linear velocity of 20.5 m/s, and the jitter at each velocity was evaluated. Note that the length of 1 T is 17.13 ns for the low linear velocity of 8.2 m/s and 6.852 ns for the high linear velocity of 20.5 m/s. Recording and playback were performed under the following conditions: such disks were rotated at recording linear velocities of 8.2 m/s and 20.5 m/s; and the semiconductor laser light having a wavelength of 650 nm was condensed by an objective lens having a numerical aperture (NA) of 0.6 to be applied through the substrate 1 to the recording layer 4. Here, evaluation criteria for jitter are as follows.

very good (double circle): jitter is 9% or less good (circle): jitter is 10% or less bad (cross): jitter is 10% or more Originally, jitter is 9% or less in the specifications of DVD-RAM. However, a target value of evaluation was set to 10%. The reason for this is that, though information recording media having the same constitution except for recording layer compositions are compared in this example, jitter can be lowered by approximately 1% by optimizing a film configuration and the compositions of the first and second boundary layers which are in contact with the recording layer, depending on each recording layer composition. A target value for evaluation was therefore raised to 10%.

Incidentally, recording/playback characteristics were evaluated for tracks of both grooves and lands, and the average value was adopted. The result of the evaluation is shown in Table 1.

TABLE 1

Table 1. Recording Layer Composition and Recording/Playback Characteristics Evaluation Result at 2× and 5× Speeds

| | | 2× Speed (8.2 m/sec) | | | 5× Speed (20.5 m/sec) | | | Over |
|---|---|---|---|---|---|---|---|---|
| Sample No. | Recording Layer Composition (at %) | OW10 Jitter | Archival Playback | Archival Overwrite | OW10 Jitter | Archival Playback | Archival Overwrite | all Judgment |
| 1 | $Bi_2Ge_{47}Te_{51}$ | ◎ | ◎ | ◎ | X | X | X | X |
| 2 | $Bi_3Ge_{47}Te_{50}$ | ◎ | ◎ | ◎ | X | X | X | X |
| 3 | $Bi_3Ge_{46.2}Te_{50.8}$ | ◎ | ◎ | ◎ | ○ | ○ | ○ | ○ |
| 4 | $Bi_4Ge_{45.5}Te_{50.5}$ | ◎ | ◎ | ◎ | ○ | ○ | ○ | ○ |
| 5 | $Bi_4Ge_{47}Te_{47}$ | ◎ | ◎ | ◎ | X | X | X | X |
| 6 | $Bi_5Ge_{46}Te_{49}$ | ◎ | ◎ | ◎ | ○ | ○ | ○ | ○ |
| 7 | $Bi_5Ge_{44.2}Te_{50.8}$ | ◎ | ◎ | ◎ | ◎ | ◎ | ◎ | ◎ |
| 8 | $Bi_5Ge_{43}Te_{52}$ | ○ | X | ○ | ◎ | ◎ | ◎ | X |
| 9 | $Bi_6Ge_{44}Te_{50}$ | ◎ | ◎ | ◎ | ◎ | ◎ | ◎ | ◎ |
| 10 | $Bi_{6.5}Ge_{41}Te_{52.5}$ | ○ | X | ○ | ◎ | ◎ | ◎ | X |
| 11 | $Bi_7Ge_{44}Te_{49}$ | ○ | ○ | ○ | ○ | ○ | ○ | ○ |
| 12 | $Bi_7Ge_{42}Te_{51}$ | ◎ | ◎ | ◎ | ◎ | ◎ | ◎ | ◎ |
| 13 | $Bi_7Ge_{43}Te_{50}$ | ◎ | ◎ | ◎ | ◎ | ◎ | ◎ | ◎ |
| 14 | $Bi_7Ge_{40}Te_{53}$ | X | X | X | ◎ | ◎ | ◎ | X |
| 15 | $Bi_7Ge_{41}Te_{52}$ | ○ | X | ○ | ◎ | ○ | ◎ | X |
| 16 | $Bi_8Ge_{39}Te_{53}$ | ○ | X | ○ | ◎ | ◎ | ◎ | X |
| 17 | $Bi_8Ge_{41}Te_{51}$ | ◎ | ◎ | ◎ | ◎ | ◎ | ◎ | ◎ |
| 18 | $Bi_{10}Ge_{38}Te_{52}$ | ◎ | ○ | ◎ | ◎ | ○ | ◎ | ○ |
| 19 | $Bi_{9.2}Ge_{39.8}Te_{51}$ | ◎ | ○ | ◎ | ◎ | ○ | ◎ | ○ |
| 20 | $Bi_9Ge_{41}Te_{50}$ | ◎ | ◎ | ◎ | ◎ | ◎ | ◎ | ◎ |
| 21 | $Bi_{10}Ge_{37}Te_{53}$ | X | X | X | ◎ | ◎ | ◎ | X |
| 22 | $Bi_{11}Ge_{38.5}Te_{50.5}$ | ○ | ○ | ○ | ◎ | ◎ | ◎ | ○ |
| 23 | $Bi_{12}Ge_{37}Te_{51}$ | X | X | X | ◎ | ◎ | ◎ | X |
| 24 | $Bi_6Ge_{46}Te_{48}$ | ◎ | ◎ | ◎ | X | X | X | X |
| 25 | $Bi_8Ge_{44}Te_{48}$ | ◎ | ◎ | ◎ | X | X | X | X |
| 26 | $Bi_{13}Ge_{39}Te_{48}$ | ○ | ○ | ○ | X | X | X | X |
| 27 | $Bi_{13}Ge_{38}Te_{49}$ | ○ | ○ | ○ | ○ | ○ | ○ | ○ |

As apparent from Table 1, sample Nos. 3, 4, 6, 7, 9, 11, 12, 13, 15, 16 to 20, 22, and 27 show favorable characteristics in a wide range from a linear velocity of 8.2 m/sec., which is a 2× speed, to a linear velocity of 20.5 m/sec., which is a 5× speed. Accordingly, in the case where a Bi—Ge—Te alloy is used for a recording layer of a phase-change optical recording medium, a practical composition range is a range surrounded by the points (Bi3, Ge46.2, Te50.8), (Bi5, Ge46, Te49), (Bi13, Ge38, Te49), and (Bi10, Ge38, Te52) on a composition triangle with vertices Bi, Ge, and Te. Furthermore, it was revealed that more excellent characteristics can be obtained in compositions in a range surrounded by the points (Bi5.5, Ge44, Te50.5), (Bi6, Ge44, Te50), (Bi8, Ge41, Te51), and (Bi9, Ge41, Te50) on a composition triangle with vertices Bi, Ge, and Te.

From this result, the following can be seen: in a region where Ge was added more than those of the line connecting GeTe and Bi2Te3, advantages of GeTe were maintained, which advantages are a large difference in refractive indexes between crystalline and noncrystalline states, a high crystallization temperature, and a high activation energy; and, furthermore, a crystallization speed becomes high, and favorable erasing characteristics can be obtained even in high-speed recording. However, if Ge is excessively added, a crystalline speed is lowered. Accordingly, a region in which Ge is appropriately added is suitable. Further, as for the amount of Bi, the following is speculated: in a region where Bi is excessively added, the crystallization speed becomes too high, and re-crystallization of recording marks therefore occurs in low linear-velocity recording to deteriorate initial characteristics; and a decrease in the crystallization temperature deteriorates the shelf life.

(Preparation of First and Second Boundary Layers)

As described above, an optimum composition of the phase-change recording layer material has become apparent, with which CAV recording can be realized in a wide range from low-speed recording to high-speed recording.

In this example, in order to study a boundary layer which is excellent in multiple-rewrite performance and excellent in shelf life under a humidified environment, $Bi_7Ge_{43}Te_{50}$ (at %) was used which is considered to be most suitable for speed enhancement in the aforementioned optimum region of the recording layer composition.

A disk having the structure shown in FIG. 2 was prepared as follows.

On a polycarbonate substrate 1 of 120 mm in diameter and 0.6 mm in thickness, first, a material made of (ZnS) (80)-($SiO_2$) (20) mol % was formed as the first dielectric layer 2 to a film thickness of 150 nm, using a sputtering system which has a plurality of sputtering chambers and which has a small distribution of film thicknesses and a high reproducibility. Subsequently, a material made of Cr—Ta—O was formed as the first boundary layer 3 to a film thickness of 2 nm. Here, as for a method of forming Cr—Ta—O, two targets were attached to the inside of one sputtering chamber, one of which was a $Cr_2O_3$ target and the other of which was a $Cr_2O_3$(40)-$Ta_2O_5$—O(60) target, and the Cr—Ta—O composition was adjusted by simultaneous sputtering by changing sputtering powers of the two. On the first boundary layer 3, a material made of Bi7Ge43Te50 (at %) was formed as the recording layer 4 to a film thickness of 9 nm. A method of forming Bi7Ge43Te50 is the same as described above. Next, a material made of Cr—Ta—O was formed as the second boundary layer 5 to a film thickness of 2 nm. A method of forming Cr—Ta—O is the same as that of the above-described first boundary layer. On the second boundary layer 5, a material made of (ZnS) (80)-($SiO_2$) (20) mol % was formed as the second dielectric layer 6 to a film thickness of 30 nm. Further, a material made of Cr(85)-CrO (15) (at %) was formed as the light absorption layer 7 thereon to a film thickness of 25 nm, and then a material made of AgCu (1 wt %) Ca (500 ppm) was formed as the reflective layer 8 to a film thickness of 100 nm. A protective layer 9 made of ultraviolet curing resin was formed on the reflective layer 8, then completing a disk having a structure in which a dummy substrate having a thickness of 0.6 mm is attached thereto.

Subsequent steps are the same as described above.

Next, as for evaluation using an information recording apparatus, information was rewritten multiple times (repeated recording) at a high linear velocity of 20.5 m/s, and jitter after 80 thousand rewrites was evaluated. A target value of jitter after 80 thousand rewrites was 14% or less. Note that multiple-rewrite evaluation was performed on a groove track. Although the measurement point was on a middle track, it is a matter of course that result is the same even if measurement is performed on an inner track or an outer track.

Further, error rates were evaluated using a DVD-RAM 2× speed drive (at a linear velocity of 8.2 m/s). As for an evaluation method, random patterns recorded over the entire zone from the inner track to the outer track were evaluated. The sampling rate is 1/160.

Furthermore, after this disk was stored for 16 hours in an environment of an atmosphere of 90° C. and 80% RH, error rates were evaluated. A target value of an error rate after 16 hours of storage in an environment of an atmosphere of 90° C. and 80% RH is $1 \times 10^{-3}$ or less.

The result of the evaluation is shown in Table 2. Further, the result of evaluating a disk prepared in the same way, except for the fact that $Cr_2O_3$ was used for the first and second boundary layers, is also shown as a comparative example. Here, criteria for overall judgment are as follows.

very good (double circle): jitter is 10% or less after 80 thousand rewrites, and shelf life test result is $1 \times 10^{-4}$ or less good (circle): jitter is 14% or less after 80 thousand rewrites, and shelf life test result is $1 \times 10^{-3}$ or less bad (cross): jitter is 14% or more after 80 thousand rewrites, and shelf life test result is $1 \times 10^{-3}$ or more

TABLE 2

Table 2. Ta Content of Boundary Composition, and Result of Multiple Rewrite and High-Humidity Storage Test

| Sample No. | First Boundary Layer Ta Content (at %)* | Second Boundary Layer Ta Content (at %)* | 5× Speed (20.5 m/sec) Multiple Rewrite (jitter %) | Drive High-Humidity Storage Test | Over all Judgment |
|---|---|---|---|---|---|
| 1 | 0 (40%) | 2 (37%) | 13.3 | $7.3 \times 10^{-5}$ | ○ |
| 2 | 0 (40%) | 4 (34%) | 12.8 | $8.1 \times 10^{-5}$ | ○ |

TABLE 2-continued

Table 2. Ta Content of Boundary Composition, and Result of Multiple Rewrite and High-Humidity Storage Test

| Sample No. | First Boundary Layer Ta Content (at %)* | Second Boundary Layer Ta Content (at %)* | 5× Speed (20.5 m/sec) Multiple Rewrite (jitter %) | Drive High-Humidity Storage Test | Over all Judgment |
|---|---|---|---|---|---|
| 3 | 0 (40%) | 7 (30%) | 10.4 | $8.3 \times 10^{-5}$ | ◯ |
| 4 | 0 (40%) | 14 (20%) | 10.6 | $7.3 \times 10^{-5}$ | ◯ |
| 5 | 0 (40%) | 20 (12%) | 11.4 | $8.3 \times 10^{-3}$ | X |
| 6 | 0 (40%) | 29 (0%) | 12.2 | $1.4 \times 10^{-2}$ | X |
| 7 | 2 (37%) | 0 (40%) | 13.2 | $6.5 \times 10^{-5}$ | ◯ |
| 8 | 4 (34%) | 0 (40%) | 12.6 | $7.2 \times 10^{-5}$ | ◯ |
| 9 | 7 (30%) | 0 (40%) | 10.1 | $8.1 \times 10^{-5}$ | ◯ |
| 10 | 14 (20%) | 0 (40%) | 8.8 | $7.9 \times 10^{-5}$ | ◎ |
| 11 | 20 (12%) | 0 (40%) | 8.6 | $4.3 \times 10^{-3}$ | X |
| 12 | 29 (0%) | 0 (40%) | 9.8 | $2.3 \times 10^{-2}$ | X |
| 13 | 14 (20%) | 7 (30%) | 8.3 | $6.8 \times 10^{-5}$ | ◎ |
| 14 | 14 (20%) | 14 (20%) | 8.8 | $7.1 \times 10^{-5}$ | ◎ |
| Comparative Example | $Cr_2O_3$ | $Cr_2O_3$ | 17.6 | $6.3 \times 10^{-5}$ | X |

*The values in ( ) indicate the amounts of Cr

As apparent from Table 2, it can be seen that the Ta content of the first boundary layer is preferably in the range of 2 (at %) to 14 at %) in which multiple rewrites and shelf life are favorable, and that excellent multiple-rewrite characteristics and shelf life can be obtained by setting Ta content to 14 (at %). Further, with regard to multiple rewrites, if Ta content is further increased, favorable multiple-rewrite characteristics can also be obtained, but shelf life is deteriorated. When these optical information recording media were observed using an optical microscope, it was proved that film delamination occurred. On the other hand, also as for the second boundary layer, Ta content at which multiple rewrites and shelf life are favorable is in a similar range, and multiple rewrites and shelf life are more favorable in the range of 7 (at %) to 14 (at %). Further, if Ta content is excessive, multiple-rewrite characteristics have a trend different from that in the first boundary layer, i.e., tend to deteriorate, and film delamination occurs as in the first boundary layer. It is speculated that a cause of the deterioration in multiple-rewrite characteristics is a decrease in the crystalline speed of the recording layer with increasing Ta content.

Further, it was proved that multiple-rewrite characteristics and shelf life were significantly improved by setting the Ta content of the first boundary layer to 14 (at %) and setting that of the second boundary layer to 7 (at %) or 14 (at %) as in samples Nos. 13 and 14.

As described above, a boundary layer which satisfies multiple-rewrite characteristics and shelf life characteristics can be obtained by selecting the amount of Ta contained in the boundary layer in the range of 2 atomic percent to 14 atomic percent. That is, it is important that Cr and Ta in the following range of composition ratios exist:

$$2/37 \leq Ta/Cr \leq 14/20$$

Further, using x and y, the composition ratio between Cr and Ta is represented as follows:

$$Cr_xTa_y(0.05 \leq y/x \leq 0.7)$$

Example 2

In this example, in order to study Cr—Ta—O composition in relation to crystallization speeds on inner and outer tracks of an information recording medium, Bi7Ge43Te50(at %) was adopted as a recording layer composition as in example 1, and Cr(20)Ta(14)O(66) was adopted as a first boundary layer composition. For a second boundary layer, as a method of controlling the Ta amount ratio between inner and outer tracks, the Ta content was selectively increased in a peripheral portion by using a Cr—Ta—O target having a target size different from that of a $Cr_2O_3$ target. The range of the Ta/Cr composition ratio of the second boundary layer used this time was set as y/x=0.05 for an inner track based on the result obtained in example 1, where the Ta/Cr composition ratio is represented by $Cr_xTa_y$. For an outer track, the range of the Ta/Cr composition ratio of the second boundary layer used this time is set as follows.

$$Cr_xTa_y(0.05 \leq y/x \leq 0.7)$$

An evaluation method will be described. Using a DVD-RAM 2× speed drive (at a linear velocity of 8.2 m/s), a random pattern was recorded over the entire zone from an inner track to an outer track. Then, for an inner portion, an average error rate was calculated for zones 0 to 2; and, for an outer portion, an average error rate was calculated for zones 32 to 34. The sampling rate evaluated is 1/160. The reason the DVD-RAM 2× speed drive was used as an evaluation machine is as follows. In the aforementioned example 1, it has been proven that the excessive addition of Bi to the recording layer increases the crystallization speed of the recording layer, and deteriorates the result of evaluating 2× speed recording/playback characteristics. Similarly, when error rates were measured using the DVD-RAM 2× speed drive, an error rate in the 2× speed DVD-RAM drive exceeded $1 \times 10^{-3}$ in a disk in which Bi is excessively added and in which the crystallization speed of the recording layer is high. That is, it was considered that the crystallization speed of the recording layer can be judged from the result of evaluating an error rate in the DVD-RAM 2× speed drive.

The result of the evaluation is shown in Table 3. Further, the result of evaluating a disk prepared in the same way, except for the fact that $Cr_2O_3$ was used for the second boundary layer, is also shown as a comparative example. Here, criteria for overall judgment are as follows.

very good (double circle): $1 \times 10^{-4}$ or less in both inner and outer portions good (circle): $5 \times 10^{-4}$ or less in both inner and outer portions bad (cross): $1 \times 10^{-3}$ or less in both inner and outer portions

TABLE 3

Table 3. Ta Contents of the Second Boundary Compositions in Inner and Outer Portions and Drive Error Rates

| Sample No. | Ta Content of Second Boundary Layer in Inner Portion (at %)* | Ta Content of Second Boundary Layer in Outer Portion (at %)* | Drive Error Rate Inner Portion | Drive Error Rate Outer Portion | Judgment |
|---|---|---|---|---|---|
| 1 | 2% (37%) | 2% (37%) | $6.3 \times 10^{-5}$ | $4.8 \times 10^{-4}$ | ◯ |
| 2 | 2% (37%) | 4% (34%) | $5.4 \times 10^{-5}$ | $9.8 \times 10^{-5}$ | ◎ |
| 3 | 2% (37%) | 7% (30%) | $7.3 \times 10^{-5}$ | $9.2 \times 10^{-5}$ | ◎ |
| 4 | 2% (37%) | 14% (20%) | $7.1 \times 10^{-5}$ | $8.2 \times 10^{-5}$ | ◎ |
| Comparative Example | 0% (40%) | 0% (40%) | $7.3 \times 10^{-5}$ | $3.5 \times 10^{-3}$ | X |

*The values in ( ) indicate the amounts of Cr

The following results were obtained from Table 3.

1: The amount of Ta of the second boundary layer in the outer portion is 2% (x/y=0.05), which is the same as in the inner portion. Since the error rate in the outer portion is $4.8 \times 10^{-4}$, this sample is judged to be good (circle).

2: The amount of Ta of the second boundary layer in the outer portion is 4% (x/y=0.12). Since the error rates in both inner and outer portions are $1 \times 10^{-4}$ or less, this sample is judged to be very good (double circle).

3: The amount of Ta of the second boundary layer in the outer portion is 7% (x/y=0.23). Since the error rates in both inner and outer portions are $1 \times 10^{-4}$ or less, this sample is judged to be very good (double circle).

4: The amount of Ta of the second boundary layer in the outer portion is 14% (x/y=0.70). Since the error rates in both inner and outer portions are $1 \times 10^{-4}$ or less, this sample is judged to be very good (double circle).

Comparative Example: $Cr_2O_3$ is used for the second boundary layer. Since the error rate in the outer portion is $3.5 \times 10^{-3}$, this sample is judged to be bad (cross).

From the results, it can be seen that the crystallization speed of the recording layer is decreased by increasing the amount of Ta in Cr—Ta—O of the second boundary layer, because the error rate in the DVD-RAM 2× speed drive becomes favorable by using Cr—Ta—O for the second boundary layer and setting the Ta content in the outer portion larger than that in the inner portion.

As described above, an information recording medium in which Bi—Ge—Te is used for the recording layer and in which the inner and outer portions are identical in the crystallization speed of the recording layer can be obtained by using Cr—Ta—O for the second boundary layer and setting the Ta content in the outer portion larger than that in the inner portion.

Example 3

In this example, in order to study a boundary layer thickness which is excellent in multiple-rewrite performance and excellent in shelf life under a humidified environment, an optical information recording medium was prepared, using Bi7Ge43Te50 (at %) for the recording layer composition as in example 1, and using Cr(20)Ta(14)O(66) and Cr(37)Ta(2)O(61) for the first and second boundary layer compositions respectively.

A method of preparing the information recording medium is similar to that of example 1. The film thickness of the first boundary layer was changed in the range of 0 nm to 30.0 nm, and that of the second boundary layer was constant, 2 nm.

Next, as for evaluation in an information recording apparatus, information was rewritten multiple times (repeated recording) at a high linear velocity of 20.5 m/s, and jitter after 80 thousand rewrites was evaluated. A target value of jitter after 80 thousand rewrites is 14% or less. Note that multiple-rewrite evaluation was performed on a groove track. The result of the evaluation is shown in Table 4.

TABLE 4

Table 4. Boundary Film Thickness and Result of Multiple-Rewrite Evaluation

| Sample No. | First Boundary Layer Thickness(nm) | Second Boundary Layer Thickness(nm) | 5× Speed (20.5 m/sec) Multiple Rewrites (jitter %) |
|---|---|---|---|
| 1 | 0.0 | 2.0 | 22.3 |
| 2 | 0.5 | 2.0 | 15.6 |
| 3 | 0.8 | 2.0 | 13.2 |
| 4 | 1.0 | 2.0 | 9.8 |
| 5 | 1.3 | 2.0 | 8.7 |
| 6 | 1.5 | 2.0 | 8.5 |
| 7 | 1.8 | 2.0 | 8.3 |
| 8 | 2.0 | 2.0 | 8.6 |
| 9 | 2.5 | 2.0 | 8.9 |
| 10 | 3.0 | 2.0 | 9.4 |
| 11 | 3.5 | 2.0 | 10.2 |
| 12 | 4.0 | 2.0 | 11.3 |
| 13 | 5.0 | 2.0 | 12.5 |
| 14 | 6.0 | 2.0 | 13.7 |
| 15 | 7.0 | 2.0 | 13.6 |
| 16 | 8.0 | 2.0 | 13.9 |
| 17 | 9.0 | 2.0 | 14.8 |
| 18 | 10.0 | 2.0 | 15.4 |
| 19 | 15.0 | 2.0 | 17.3 |
| 20 | 20.0 | 2.0 | 19.2 |
| 21 | 25.0 | 2.0 | 23.6 |
| 22 | 30.0 | 2.0 | 25.8 |

As apparent from Table 4, multiple-rewrite characteristics greatly depend on the film thickness, and jitter deteriorates if the film thickness is too small or too large. Conceivable causes of this are the following: in the case where the film thickness is too small, the protective layer material is diffused in the recording film with multiple rewrites to deteriorate jitter; and, in the case where the film thickness is too large, cracks appear between portions to which a laser beam has been applied and the other portions due to thermal expansion because the thermal expansion coefficient of Cr—Ta—O material is large, and consequently the protective layer material is diffused in the recording film. Further, it was proved that a film thickness which satisfies the target is 0.8 nm to 8 nm, and that favorable jitter, which is 10% or less, can be obtained even after 80 thousand rewrites in the case where the film thickness is 1.0 nm to 3.0 nm.

What is claimed is:

1. An information recording medium in which information is recorded and played back by applying light, the information recording medium comprising:
   recording layer made of phase-change material and provided on a substrate;
   a first boundary layer provided in contact with the surface of the recording layer, the surface being on a side where the light is incident; and
   a second boundary layer provided in contact with the opposite surface of the recording layer from the side where the light is incident,
   wherein the recording layer contains bismuth (Bi), germanium (Ge), and tellurium (Te),
   wherein the recording layer is made of the phase-change material having a composition ratio in a range surrounded by the following four points (A1, A2, B1, and B2) represented by coordinates on a composition triangle having the bismuth (Bi), the germanium (Ge), and the tellurium (Te) at the vertices thereof:
   A1 (Bi3, Ge46.2, Te50.8)
   A2 (Bi5, Ge46, Te49)
   B1 (Bi13, Ge38, Te49)
   B2 (Bi10, Ge38, Te52)
   where coordinates on the composition triangle are expressed in atomic percent,
      at least one of the first and second boundary layers contains chromium (Cr), tantalum (Ta), and oxygen (O) and has a film thickness of 0.8 nm to 8 nm, and
      wherein at least one of the first and second boundary layers contains the chromium (Cr) and the tantalum (Ta) in a range in which a composition ratio (y/x) of a content (y) of the tantalum (Ta) to a content (x) of the chromium (Cr) is 0.05 to 0.7(0.05<(y/x)<0.7).

2. The information recording medium according to claim 1, wherein the recording layer is made of the phase-change material having a composition ratio in a range surrounded by the following four points (A3, A4, B3, and B4) represented by coordinates on a composition triangle having the bismuth (Bi), the germanium (Ge), and the tellurium (Te) at vertices thereof:
   A3 (Bi5.5, Ge44, Te50.5)
   A4 (Bi6, Ge44, Te50)
   B3 (Bi8, Ge41, Te51)
   B4 (Bi9, Ge41, Te50)
   where coordinates on the composition triangle are expressed in atomic percent.

3. The information recording medium according to claim 1, wherein a content of tantalum (Ta) contained in the first boundary layer is larger than that of tantalum (Ta) contained in the second boundary layer.

4. The information recording medium according to claim 1, wherein at least one of the first and second boundary layers has a composition gradient of a content of the contained tantalum (Ta) so that a proportion of tantalum (Ta) contained in an outer portion is larger than that of tantalum (Ta) contained in an inner portion.

5. The information recording medium according to claim 1, wherein the first and second boundary layers contain the chromium (Cr), the tantalum (Ta), and the oxygen (O).

6. The information recording medium according to claim 1, further comprising:
   a light absorption layer provided on the second boundary layer, the light absorption layer containing chromium (Cr) and chromium oxide, wherein a range of a content of the chromium (Cr) is 85 atomic percent to 90 atomic percent.

7. The information recording medium according to claim 6, wherein a film thickness of the light absorption layer is 10 nm to 50 nm.

8. The information recording medium according to claim 6, further comprising a reflective layer provided on the light absorption layer.

9. An information recording medium in which information is recorded and played back by applying light, the information recording medium comprising:
   a recording layer made of phase-change material and provided on a substrate;
   a first boundary layer provided in contact with the surface of the recording layer, the surface being on a side where the light is incident; and
   a second boundary layer provided in contact with the opposite surface of the recording layer from the side where the light is incident,
   wherein the recording layer contains bismuth (Bi), germanium (Ge), and tellurium (Te),
   wherein the recording layer is made of the phase-change material having a composition ratio in a range surrounded by the following four points (A1, A2, B1, and B2) represented by coordinates on a composition triangle having the bismuth (Bi), the germanium (Ge), and the tellurium (Te) at the vertices thereof:
   A1 (Bi3, Ge46.2, Te50.8)
   A2 (Bi5, Ge46, Te49)
   B1 (Bi13, Ge38, Te49)
   B2 (Bi10, Ge38, Te52)
   where coordinates on the composition triangle are expressed in atomic percent,
      at least one of the first and second boundary layers contains chromium (Cr), tantalum (Ta), and oxygen (O) and has a film thickness of 0.8 nm to 8 nm, and
      wherein at least one of the first and second boundary layers contains the tantalum (Ta) in a range in which a content of the tantalum (Ta) is from 2 atomic percent to 14 atomic percent.

10. The information recording medium according to claim 9, wherein the recording layer is made of the phase-change material having a composition ratio in a range surrounded by the following four points (A3, A4, B3, and B4) represented by coordinates on a composition triangle having the bismuth (Bi), the germanium (Ge), and the tellurium (Te) at vertices thereof:
    A3 (Bi5.5, Ge44, Te50.5)
    A4 (Bi6, Ge44, Te50)
    B3 (Bi8, Ge41, Te51)
    B4 (Bi9, Ge41, Te50)
    where coordinates on the composition triangle are expressed in atomic percent.

11. The information recording medium according to claim 9, wherein a content of tantalum (Ta) contained in the first boundary layer is larger than that of tantalum (Ta) contained in the second boundary layer.

12. The information recording medium according to claim 9, wherein at least one of the first and second boundary layers has a composition gradient of a content of the contained tantalum (Ta) so that a proportion of tantalum (Ta) contained in an outer portion is larger than that of tantalum (Ta) contained in an inner portion.

13. The information recording medium according to claim 9, wherein the first and second boundary layers contain the chromium (Cr), the tantalum (Ta), and the oxygen (O).

14. The information recording medium according to claim 9, further comprising:
    a light absorption layer provided on the second boundary layer, the light absorption layer containing chromium (Cr) and chromium oxide, wherein a range of a content of the chromium (Cr) is 85 atomic percent to 90 atomic percent.

* * * * *